United States Patent
Keller et al.

(10) Patent No.: US 8,202,588 B2
(45) Date of Patent: Jun. 19, 2012

(54) HYBRID CERAMIC STRUCTURE WITH INTERNAL COOLING ARRANGEMENTS

(75) Inventors: Dougas A. Keller, Kalamazoo, MI (US); Malberto F. Gonzalez, Orlando, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 955 days.

(21) Appl. No.: 12/099,434

(22) Filed: Apr. 8, 2008

(65) Prior Publication Data

US 2009/0252907 A1    Oct. 8, 2009

(51) Int. Cl.
*B32B 1/08*    (2006.01)
*F16L 9/10*    (2006.01)
*F16L 9/14*    (2006.01)
*F16L 9/18*    (2006.01)

(52) U.S. Cl. .............. 428/34.5; 428/34.4; 428/34.6; 138/111; 138/141; 138/147; 138/153

(58) Field of Classification Search ............ 428/34.1, 428/34.4, 34.5, 34.6, 34.7, 35.7, 35.8, 35.9, 428/36.1, 36.2, 36.4, 36.5, 36.8, 36.9, 36.91; 138/111–117, 140–153
See application file for complete search history.

(56) References Cited

U.S. PATENT DOCUMENTS

| | | | |
|---|---|---|---|
| 4,199,936 A | 4/1980 | Cowan et al. | |
| 5,181,379 A | 1/1993 | Wakeman et al. | |
| 5,233,828 A | 8/1993 | Napoli | |
| 5,279,127 A | 1/1994 | Napoli | |
| 5,483,794 A | 1/1996 | Nicoli et al. | |
| 5,687,572 A | 11/1997 | Schrantz et al. | |
| 5,816,777 A | 10/1998 | Hall | |
| 5,970,715 A | 10/1999 | Narang | |
| 6,013,592 A | 1/2000 | Merrill et al. | |
| 6,197,424 B1 | 3/2001 | Morrison et al. | |
| 6,235,370 B1 | 5/2001 | Merrill et al. | |
| 6,287,511 B1 | 9/2001 | Merrill et al. | |
| 6,655,147 B2 | 12/2003 | Farmer et al. | |
| 6,709,230 B2 | 3/2004 | Morrison et al. | |
| 6,733,907 B2 | 5/2004 | Morrison et al. | |
| 6,746,755 B2 | 6/2004 | Morrison et al. | |
| 6,758,653 B2 | 7/2004 | Morrison | |
| 6,767,659 B1 | 7/2004 | Campbell | |
| 6,984,277 B2 | 1/2006 | Morrison et al. | |
| 7,067,447 B2 | 6/2006 | Campbell | |
| 7,093,359 B2 | 8/2006 | Morrison et al. | |
| 7,153,096 B2 * | 12/2006 | Thompson et al. | 415/200 |
| 7,179,524 B2 | 2/2007 | Merrill et al. | |

\* cited by examiner

*Primary Examiner* — Walter B Aughenbaugh

(57) ABSTRACT

A structure for use in high temperature applications is provided. The structure may include an inner ceramic matrix composite (CMC) material (12). At least a portion of this CMC material includes waves that define a first wavy surface (140 and an opposed second wavy surface (16). A ceramic insulation material (18) may be bonded with the first wavy surface and includes a distal surface (20) for exposure to a high temperature environment. A core material (22) is bonded with at least a portion of the second wavy surface. One or more cooling channels (24) are disposed in the core material. An outer CMC material (26) may be joined to a portion of the inner CMC material. The core material is a material different than a matrix material of the inner CMC material.

20 Claims, 3 Drawing Sheets

HYBRID CERAMIC STRUCTURE WITH INTERNAL COOLING ARRANGEMENTS

FIELD OF THE INVENTION

The present invention relates generally to internal cooling arrangements for a hybrid ceramic structure, and, more particularly, to a structure including an inner ceramic matrix composite (CMC) member and an outer CMC member joined to a portion of the inner CMC member. The inner CMC and the outer CMC members define spaced apart regions (e.g., pockets) where one or more cooling channels are constructed in a core material.

BACKGROUND OF THE INVENTION

Engine components in the hot gas flow of modern combustion turbines are required to operate at ever-increasing temperatures as engine efficiency requirements continue to advance. Ceramics typically have higher heat tolerance and lower thermal conductivities than metals, particularly in the case of oxide-based ceramic materials. For this reason, ceramics have been used both as structural materials in place of metallic materials and as coatings for both metal and ceramic structures. Ceramic matrix composite (CMC) wall structures with ceramic insulation outer coatings, such as described in commonly owned U.S. Pat. No. 6,197,424, have been developed to provide components with the high temperature stability of ceramics without the brittleness of monolithic ceramics.

Film cooling is sometimes used to reduce the temperature of the hot working gas along the surface of components, thereby lowering the heat load on the component. This requires a large volume of cooling air to be supplied through many film channels and outlets across the width and length of the component surface. Convective or impingement cooling on back surfaces of component walls is also used to remove heat passing through the walls. However, backside cooling efficiency is reduced by the low thermal conductivity of ceramic material and by the fact that the wall thickness of a CMC structure may be thicker than in an equivalent metal structure.

Commonly owned U.S. Pat. No. 6,709,230 describes cooling channels in a ceramic core of a gas turbine vane behind an outer CMC airfoil shell. Commonly owned U.S. Pat. No. 6,746,755 uses ceramic matrix composite cooling tubes between CMC face sheets to form a CMC wall structure with internal cooling channels. Commonly owned U.S. Pat. No. 6,984,277 describes surface undulations on a CMC surface for bond enhancement. Further improvements in the cooling of a ceramic matrix composite wall structure are desired to support further increases in the firing temperatures of advanced gas turbine engines.

BRIEF DESCRIPTION OF THE DRAWINGS

The invention is explained in the following description in view of the drawings that show.

DETAILED DESCRIPTION OF THE INVENTION

Figure 1:
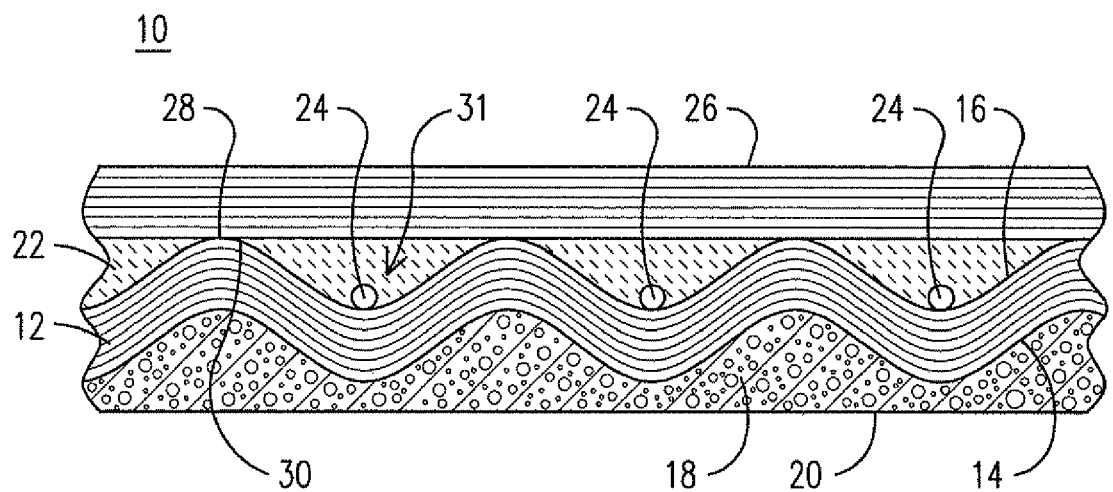
FIG. 1 is a cross-sectional view of a hybrid ceramic structure embodying example features of the present invention.

FIG. 1 is a cross-sectional view of a structure 10 (e.g., a hybrid ceramic structure) for use in high temperature applications, such as in engine components exposed to a hot gas flow in a combustion turbine. Structure 10 includes an inner ceramic matrix composite (CMC) material 12. At least a portion of CMC material 12 is formed with waves or corrugations that define a first wavy surface 14 and an opposed second wavy surface 16, generally parallel to each other. The CMC member 12 may be reinforced with continuous ceramic fibers oriented predominantly parallel to the wavy surfaces 14 and 16. A ceramic insulation material 18 may be optionally bonded with first wavy surface 16 and includes a distal surface 20 for exposure to a high temperature environment.

In example embodiments, ceramic insulation material 18 is of a wearable type, such as described in commonly assigned U.S. Pat. Nos. 6,013,592, 6,197,424, 6,235,370, and 6,287,511, which are incorporated by reference herein as to such teachings. Ceramic insulation material 18 may be a material that is non-reinforced and has a heterogeneous microstructure.

A core material 22 is bonded with at least a portion of second wavy surface 16 of inner CMC material 12. Core material 22 is a material different than a matrix material of inner CMC material 12. For example, the coefficient of thermal conductivity of core material 22 may be higher relative to the coefficient of thermal conductivity of inner CMC material 12.

In example embodiments, core material 22 may be as described in commonly assigned U.S. Pat. No. 7,067,447, which is incorporated by reference herein. Suitable alternates for core material 22 may be any of various castable refractory compositions, such as alumina and/or mullite compositions. Other desirable properties for core material 22 are: low elastic modulus; high strain tolerance; good thermal expansion match relative to the CMC material; low permeability (e.g., low amount of continuous porosity—or even substantially small pores). Other candidates for the core material may include AN-191 material and its related family of materials, commercially available from Saint-Gobain, Worcester, Mass. These and other refractory materials can also include reinforcements, such as discontinuous ceramic fibers or whiskers.

As further shown in FIG. 1, one or more cooling channels 24 are disposed in core material 22. It will be appreciated that specific cooling channel characteristics, such as size, number, and inter-channel spacing, may vary based on the specific cooling needs of a given component. In one example embodiment, the cooling channels in core material 22 may be formed during a casting process. For example, core material 22 may be cast in a viscous condition and then dried to a green condition. While in the viscous condition, one may insert into the core material 22 rods made of a fugitive material to form the cooling channels. It will be appreciated that forming the cooling channels in core material 22 is relatively simpler and more economical than forming such channels directly in the CMC material, as has been done in known internal cooling structures. For example, the CMC material is typically laid up as fabric weavings and then compacted using an appropriate amount of compaction force. Accordingly, constructing the cooling channels in the CMC material requires cumbersome, and relatively costlier, processing of the fabric weavings and may require structural support inside the cooling channels to maintain the structural integrity of the channels during compaction. In the present structural arrangement, core material 22 does not require any compaction, pressurization or any action that could affect the structural integrity of the cooling channels. In various example embodiments, densified tubes may be inserted into the channels to provide enhanced structural strengthening of the cooling channels against leaks and cracks. For example, monolithic mullite or alumina hollow tubes readily available from a variety of sources can be used. Alternately, braided ceramic fiber hollow tubes can be incorporated in various stages of processing (e.g., pre-densified & fired, green, or dry preform).

An outer CMC material 26 is joined to a portion of inner CMC material 12 (each also referred to as a CMC member). In one example embodiment, as shown in FIG. 1, an inner surface 28 of outer CMC material 26 is joined directly to inner CMC material 12 at a crest 30 of the second wavy surface 16 of the inner CMC material and indirectly via bonding to the core material 22. The inner CMC material 12 and the outer CMC material include spaced apart regions that define pockets 31 for containing core material 22. The outer CMC material is desirable because it provides stiffness to the overall hybrid structure, such as stiffness against bending loads perpendicular to the longitudinal axis of the waves. The core material is desirable on the backside of the inner CMC material because the cooling flow required to cool such an inner CMC material is relatively small. If no core material was used to fill the pockets between the inner CMC material and the outer CMC material, the larger cross-sectional area of such a pocket would require an excessive amount of cooling air. Moreover, since the coefficient of thermal conductivity of core material 22 is higher relative to the coefficient of thermal conductivity of inner CMC material 12, the absence of a core material would reduce the heat transfer from the inner CMC material so that the structure may not be sufficiently cooled. One example of a composition for the inner or outer CMC member is AN-720—an oxide fiber/oxide matrix CMC material (Nextel™ 720 fiber/alumina matrix composite) commercially available from COI Ceramics, Inc. of San Diego, Calif.

It will be appreciated that the outer CMC material 26 may be of different composition than the inner CMC material 22. For example, the outer CMC material, being in a cooler region than the inner CMC material, may be selected to take advantage of higher strength or lower cost alternatives. For example, AS-N720 material, available from COI Ceramics, Inc. (an aluminosilicate matrix version) has higher interlaminar and bond strength characteristics than AN-720 material, but a lower operating temperature capability. Similarly, AS-N610 material has similar characteristics but uses a lower cost, lower temperature fiber (Nextel™ 610 from 3M). Such combinations can take advantage of other characteristics of these material combinations, such as thermal conductivity, thermal expansion, lower processing temperature, etc.

Figure 2:
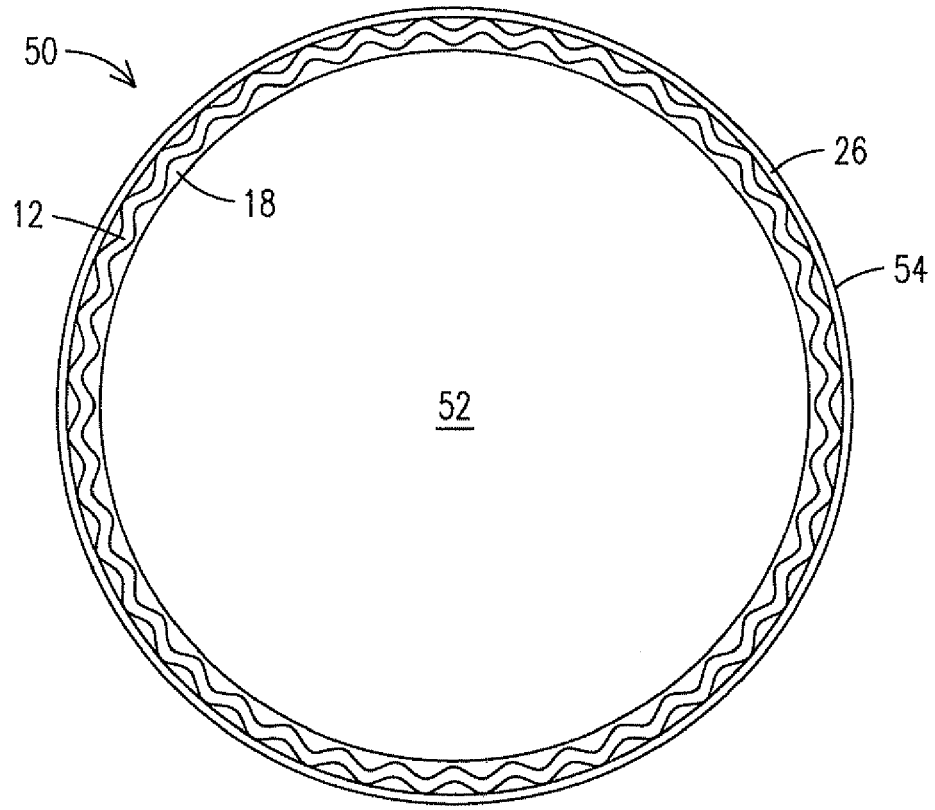
FIG. 2 is a cross-sectional view of a hybrid ceramic structure as may be configured for use in a circumferentially closed tubular structure.

FIG. 2 is a cross-sectional view of a hybrid ceramic structure as may be configured for use in a circumferentially closed tubular structure 50. The tubular structure defines at least a central passageway 52 for the passage of a hot gas through the passageway. In one example embodiment, the outer CMC material constitutes a circumferentially closed wrap 54 about the tubular structure. Thus, it will be appreciated that a hybrid ceramic structure embodying aspects of the present invention may be useful for closed structures as well as for open structures, such as a flat plate.

Figure 3:
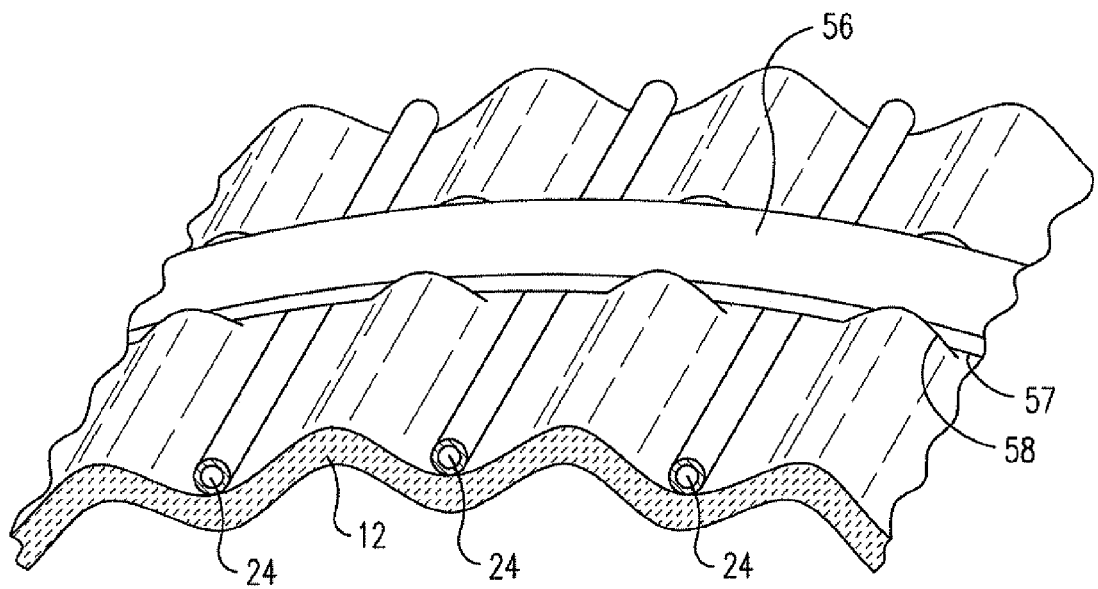
FIG. 3 is an isometric view illustrating an outer ceramic matrix composite (CMC) strap as may be configured in a circumferentially closed tubular structure.

For simplicity of illustration, FIG. 3 does not show the core material and the ceramic insulation material shown in previous figures. As illustrated in FIG. 3, the outer CMC material may be designed as a circumferentially closed strap 56 about the tubular structure. That is, the outer CMC material 26 need not enclose the entire backend of the hybrid ceramic structure as would the wrap of FIG. 2. As shown in FIG. 3, the bonding of strap 56 to the crests of wavy inner CMC material 12 may be a sub-surface bond to trap the cooling channels. In this case, the outer strap 56 may be bonded by its inner surface 57 to the core material (not shown in FIG. 3) and to the cut edges 58 of the inner CMC material. Alternately, the outer CMC strap 56 may be bonded directly to the cooling channel 24 outer surface and simultaneously to the core 22. Variations between FIG. 3 and FIG. 1 can be readily envisioned, such as where the CMC outer material is not of a constant thickness, is not necessarily continuous in an axial direction, nor is it limited to bonding solely at the peaks of the inner CMC waves.

Figure 4:
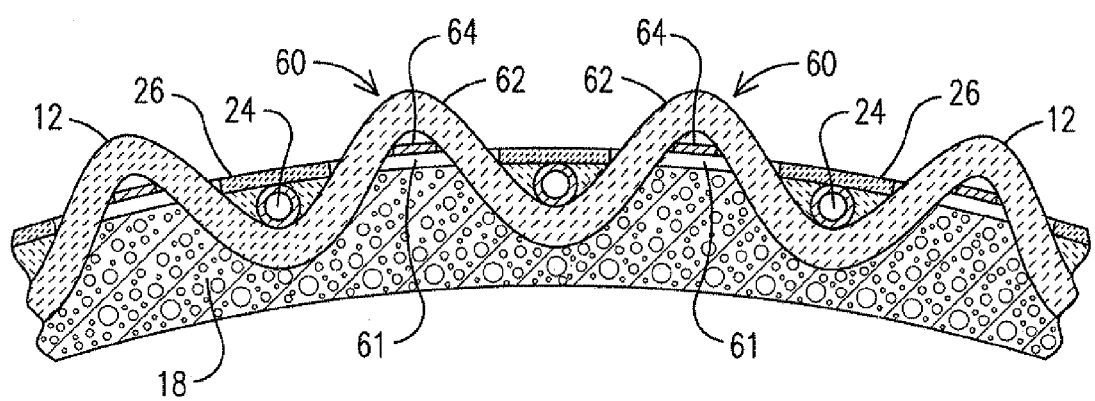
FIG. 4 is a cross-sectional view of a hybrid ceramic structure illustrating an interlocking device as may configured for interlocking an inner wavy CMC material with an outer CMC material.
Figure 5:
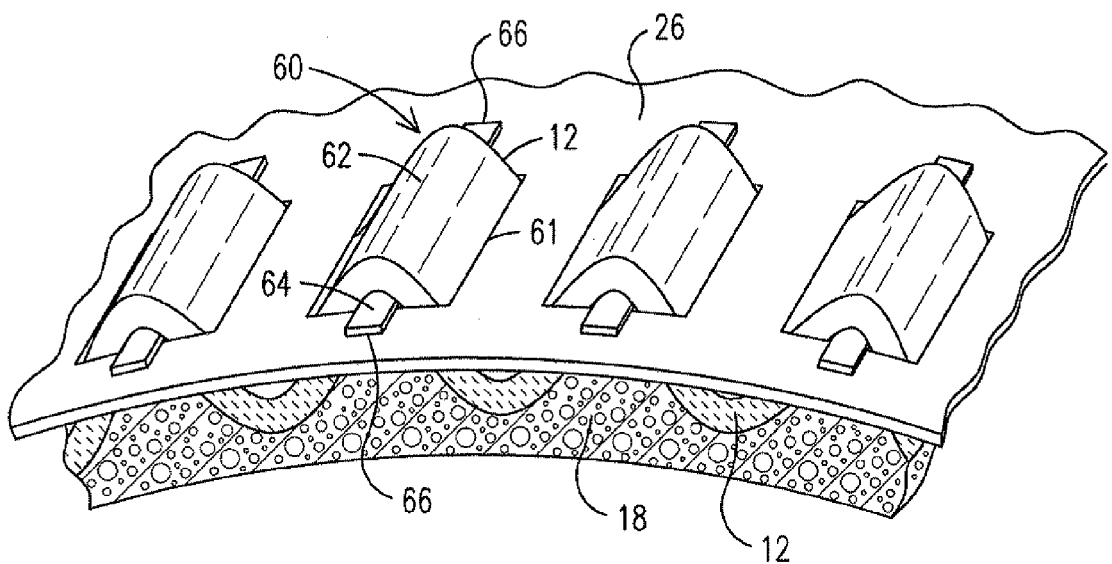
FIG. 5 is an isometric view of the hybrid ceramic structure of FIG. 4.

FIGS. 4 and 5, respectively, a cross-sectional view and an isometric view of a hybrid ceramic structure, illustrate an interlocking device 60 as may be configured for interlocking wavy inner CMC material 12 to outer CMC material 26. In this example embodiment, outer CMC material 26 includes a plurality of openings 61 in correspondence with at least some of the crests formed by second wavy surface 16 of inner CMC material 12. The openings 61 in essence allow each crest to form a loop 62 where a locking tab 64 may be inserted. In one example embodiment, opposite ends 66 of the tab 64 outside the loop are positioned against the outer CMC material and the portion of the tab trapped in the loop defined by the wavy CMC material in combination provide a locking function between the wavy inner CMC material 12 and the outer CMC material 26.

Figure 6:
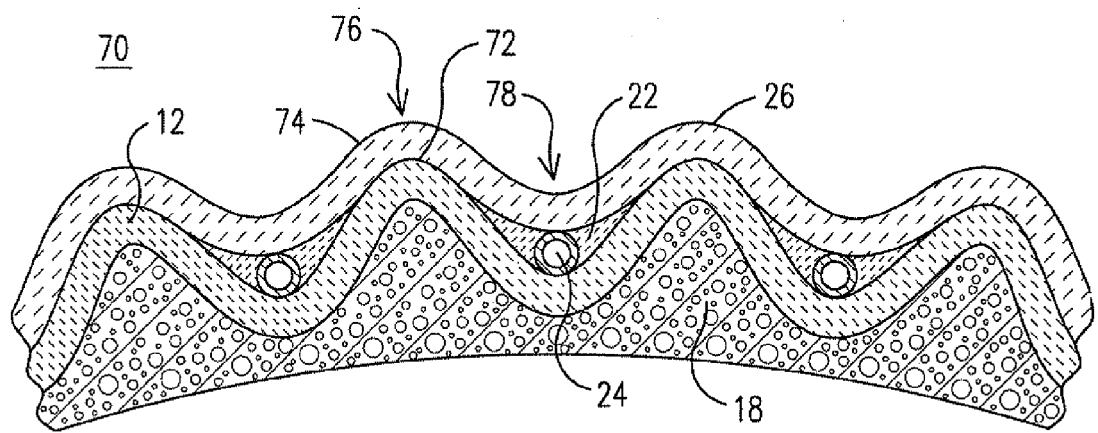
FIG. 6 is a cross-sectional view of a hybrid ceramic structure where the outer and inner CMC materials have wavy surfaces.

FIG. 6 is a cross-sectional view of a hybrid ceramic structure 70 where the outer CMC material 26 includes a first wavy surface 72 and a second wavy surface 74. By way of example, the first wavy surface 72 of the outer CMC material may be joined to the second wavy surface of the inner CMC material 12 at corresponding crest regions 76 of the second wavy surface. In addition, the first wavy surface 72 of the outer CMC material 26 is spaced apart from the first wavy surface of the inner CMC material 12 at corresponding valley regions 78 of the second wavy surface to define respective pockets for containing core material 22 and constructing the cooling channels 24.

Construction of apparatuses of the present invention may be accomplished by any methods known to those skilled in the art. Examples of construction methods, and of particular ceramic materials, are provided in the immediately above-cited patents and also in commonly assigned U.S. Pat. Nos. 6,733,907 and 7,093,359, which are incorporated by reference herein as to such teachings. Further to construction approaches, some members of the hybrid ceramic structure may be manufactured in numerous ways that include, but are not limited to, the following examples:

1. The ceramic insulation material can be cast first and machined on the outside to have a wavy surface that matches the first wavy surface. Then ceramic fabric can be laid up on that wavy surface and processed into the wavy CMC material with the appropriate matrix, etc.

2. The CMC material can be laid up in a mold to a desired specific shape. After it is fully fired, the ceramic insulation material can be cast inside it, along the first wavy surface.

3. The CMC material can be fiber wound as a cylinder and then formed into a wavy structure. The ceramic insulation material can then be cast on the CMC material.

4. The CMC outer wrap may be formed by filament winding over a previously formed inner assembly (including the inner CMC 12, cooling channels 24, core material 22, and/or insulating layer 18). This inner assembly is preferably pre-fired to a bisque condition for durability during subsequent processing. After addition of the outer CMC material, the final assembly is co-fired to a final temperature.

5. For cases where a lower temperature outer CMC material is used, the inner assembly (as in case 4) is preferably fired to a higher temperature than the final assembly.

In operation, the inclusion of cooling channels at a core member 22 having a higher coefficient of thermal conductivity relative to the coefficient of thermal conductivity of inner CMC member 12, substantially improves the heat transfer from the inner CMC member. In essence, the entire core material may be viewed as a heat sink and expands the surface region of effective cooling provided by the cooling channels. Moreover, this arrangement allows efficient cooling since heat is being drawn out closer to the limiting temperature location of the inner CMC member. This arrangement not only keeps the inner CMC member within its temperature capability using less air, but it also substantially reduces any thermal gradient through the CMC. Furthermore, since the heat is being drawn out approximately at the middle of the hybrid CMC structure, the CMC member can be thinned, potentially up to approximately 60% thinner, compared to a CMC member not including the above-described cooling arrangement. The arrangement of a core material disposed within an inner CMC member and an outer core CMC member is also advantageous because it results in a mechanically stiff structure without a heat transfer penalty that would be incurred in the absence of the packets being filled with the above-described core material.

While various embodiments of the present invention have been shown and described herein, it will be obvious that such embodiments are provided by way of example only. Numerous variations, changes and substitutions may be made without departing from the invention herein. For example, analogous advantages and processing steps for non-oxide CMC compositions may now be envisioned by those skilled in the art. Accordingly, it is intended that the invention be limited only by the spirit and scope of the appended claims.

The invention claimed is:

1. A structure comprising:
  an inner ceramic matrix composite (CMC) material, at least a portion of which comprises waves, the waves defining a first wavy surface and an opposed second wavy surface;
  a core material bonded with at least a portion of the second wavy surface, wherein a coefficient of thermal conductivity of the core material is higher relative to a coefficient of thermal conductivity of the inner CMC material;
  a cooling channel disposed in the core material; and
  an outer CMC material joined to a portion of the inner CMC material, wherein the core material comprises a material different than a matrix material and/or the material of the fibers of the inner CMC material.

2. The structure of claim 1 comprising a tubular structure, the tubular structure having a thermal insulation layer defining at least a central passageway therein, the distal surface of the thermal insulation layer having a non-wavy surface for the passage of a hot gas through the passageway.

3. The structure of claim 1, wherein an inner surface of the outer CMC material is joined to the inner CMC material at a crest of the second wavy surface of the inner CMC material.

4. The structure of claim 1, wherein the outer CMC material is joined to the inner CMC material through at least one interlocking device.

5. The structure of claim 2, wherein the outer CMC material comprises a circumferentially closed wrap about the tubular structure, wherein the wrap is arranged to enclose an entire outer surface of a cylindrical portion of the tubular structure.

6. The structure of claim 2, wherein the outer CMC material comprises a circumferentially closed strap about the tubular structure, wherein the strap is arranged to partially enclose an outer surface of a cylindrical portion of the tubular structure.

7. The structure of claim 1, wherein the outer CMC material comprises a first wavy surface and a second wavy surface.

8. The structure of claim 7, wherein the second wavy surface of the outer CMC material is joined to the second wavy surface of the inner CMC material at corresponding crest regions of said second wavy surfaces.

9. The structure of claim 8, wherein the second wavy surface of the outer CMC material is spaced apart from the second wavy surface of the inner CMC material at corresponding valley regions of said second wavy surfaces to define a pocket for containing the core material.

10. The structure of claim 1, further comprising a ceramic insulation material bonded with the first wavy surface and comprising a distal surface for exposure to a high temperature environment.

11. The structure of claim 1, wherein the inner CMC material comprises a first material composition, and the outer CMC material comprises a second material composition, and further wherein said first and second material compositions are different from one another.

12. A hybrid ceramic structure comprising:
  an inner ceramic matrix composite (CMC) member, at least a portion of which comprises waves defining a first wavy surface and an opposed second wavy surface;
  a thermal insulation member bonded with the first wavy surface, and comprising a distal surface;
  an outer CMC member joined to a portion of the inner CMC member, the inner CMC and the outer CMC members comprising spaced apart regions that define at least one pocket therebetween;
  a core material disposed in at least a portion of said pocket, wherein the core material comprises a material different than a matrix material and/or the material of the fibers of the inner CMC member, wherein a coefficient of thermal conductivity of the core material is higher relative to a coefficient of thermal conductivity of the inner CMC material; and
  a cooling channel disposed in the core material.

13. The structure of claim 12, wherein an inner surface of the outer CMC member is joined to the inner CMC member at a crest of the second wavy surface of the inner CMC member.

14. The structure of claim 12, wherein the outer CMC member is joined to the inner CMC member through at least one interlocking device.

15. The structure of claim 12, wherein the outer CMC member comprises a first wavy surface and a second wavy surface.

16. The structure of claim 15, wherein the second wavy surface of the outer CMC member is joined to the second wavy surface of the inner CMC member at corresponding crest regions of said second wavy surfaces.

17. The structure of claim 16, wherein the second wavy surface of the outer CMC member is spaced apart from the second wavy surface of the inner CMC member at corresponding valley regions of said second wavy surfaces to define the pocket for containing the core material.

18. A tubular structure comprising:
an inner ceramic matrix composite (CMC) material, at least a portion of which comprises waves, the waves defining a first wavy surface and an opposed second wavy surface;
a ceramic insulation material bonded with the first wavy surface and comprising a distal surface for exposure to a high temperature environment;
a core material bonded with at least a portion of the second wavy surface, wherein a coefficient of thermal conductivity of the core material is higher relative to a coefficient of thermal conductivity of the inner CMC material;
a cooling channel disposed in the core material; and
an outer CMC member joined to a portion of the inner CMC material, wherein the core material comprises a material different than a matrix material and/or the material of the fibers of the inner CMC material, and further wherein the tubular structure includes a thermal insulation layer, which defines at least a central passageway therein, the distal surface of the thermal insulation layer having a non-wavy surface for the passage of a hot gas through the passageway.

19. The structure of claim 18, wherein the outer CMC material comprises a circumferentially closed wrap about the tubular structure, wherein the wrap is arranged to enclose an entire outer surface of a cylindrical portion of the tubular structure.

20. A structure comprising:
an inner ceramic matrix composite (CMC) material, at least a portion of which comprises waves, the waves defining a first wavy surface and an opposed second wavy surface;
a core material bonded with at least a portion of the second wavy surface;
a cooling channel disposed in the core material; and
an outer CMC material joined to a portion of the inner CMC material, wherein the core material comprises a material different than a matrix material and/or the material of the fibers of the inner CMC material, wherein the fibers of the inner CMC material comprise a plurality of continuous fibers extending parallel to the first and second wavy surfaces.

* * * * *